US012608542B2

(12) United States Patent
Kato

(10) Patent No.: US 12,608,542 B2
(45) Date of Patent: Apr. 21, 2026

(54) DEFECT KNOWLEDGE CIRCULATION SYSTEM

(71) Applicant: HITACHI, Ltd., Tokyo (JP)

(72) Inventor: Takumi Kato, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 265 days.

(21) Appl. No.: 18/593,718

(22) Filed: Mar. 1, 2024

(65) Prior Publication Data

US 2025/0278561 A1     Sep. 4, 2025

(51) Int. Cl.
*G06F 40/20*          (2020.01)
*G06F 16/34*          (2025.01)

(52) U.S. Cl.
CPC ............ *G06F 40/20* (2020.01); *G06F 16/345* (2019.01)

(58) Field of Classification Search
CPC ....... G10L 15/22; G10L 15/02; G10L 15/063; G10L 15/1815; G06F 40/253; G06F 40/117; G06F 40/30; G06F 40/20; G06F 16/345; G06Q 10/20; G06Q 10/103
See application file for complete search history.

(56) References Cited

U.S. PATENT DOCUMENTS

| | | | | | |
|---|---|---|---|---|---|
| 7,007,038 | B1 * | 2/2006 | Kazemi | ................... | G06Q 10/06 |
| 10,573,312 | B1 * | 2/2020 | Thomson | ................. | G10L 15/22 |
| 11,182,748 | B1 * | 11/2021 | Neckermann | .......... | G06N 5/022 |
| 2012/0210203 | A1 * | 8/2012 | Kandekar | ............. | G06F 16/345 |
| | | | | | 715/230 |

| | | | | | |
|---|---|---|---|---|---|
| 2015/0195406 | A1 * | 7/2015 | Dwyer | .................... | G06F 40/30 |
| | | | | | 379/265.07 |
| 2018/0061256 | A1 * | 3/2018 | Elchik | ....................... | G09B 5/02 |
| 2019/0245972 | A1 * | 8/2019 | Dwyer | ............. | H04M 3/42221 |
| 2019/0333205 | A1 | 10/2019 | Fang et al. | | |
| 2020/0279621 | A1 * | 9/2020 | Degenaro | ................ | G06N 5/01 |
| 2021/0311973 | A1 * | 10/2021 | Radhakrishnan | ....... | G06F 40/30 |
| 2021/0342361 | A1 * | 11/2021 | Radzewsky | ............. | G06F 16/23 |
| 2022/0138697 | A1 * | 5/2022 | Neckermann | ........... | G06N 5/02 |
| | | | | | 709/204 |
| 2023/0179709 | A1 * | 6/2023 | Dwyer | ................ | G06F 21/6254 |
| | | | | | 379/265.03 |
| 2023/0230589 | A1 * | 7/2023 | Giovanardi | ........... | G06F 40/279 |
| | | | | | 704/232 |
| 2023/0315987 | A1 * | 10/2023 | Shires | ....................... | H04N 7/15 |
| | | | | | 704/9 |

(Continued)

FOREIGN PATENT DOCUMENTS

| | | | | | |
|---|---|---|---|---|---|
| CA | 2744744 | A1 * | 1/2012 | ............. | G11B 27/28 |
| CA | 3052862 | A1 * | 2/2020 | ............. | G06Q 40/12 |

(Continued)

*Primary Examiner* — Mohammad K Islam
(74) *Attorney, Agent, or Firm* — PROCOPIO, CORY, HARGREAVES & SAVITCH LLP

(57)          ABSTRACT

A method for performing defect summarization, the method comprising: receiving, by a processor, defect records associated with an operation; receiving, by the processor, work information associated with the operation linking, by the processor, the defect records and the work information using a first Artificial Intelligence (AI) model to generate linked information; and performing, by the processor, summary generation using a second AI model to generate work summary using summarization keywords, the defect records, and the work information, as input to the second AI model.

12 Claims, 11 Drawing Sheets

(56)                    References Cited

U.S. PATENT DOCUMENTS

| | | | | |
|---|---|---|---|---|
| 2024/0143603 | A1 * | 5/2024 | Daga | G06F 16/243 |
| 2025/0217400 | A1 * | 7/2025 | Mansfield | G06F 16/338 |

FOREIGN PATENT DOCUMENTS

| | | | | | |
|---|---|---|---|---|---|
| CA | 3148554 | A1 * | 2/2021 | | G06N 3/045 |
| CA | 3178823 | A1 * | 5/2022 | | G10L 21/00 |
| CA | 3016169 | C * | 1/2024 | | G06F 16/435 |
| CN | 103714813 | A * | 4/2014 | | G10L 15/22 |
| CN | 111062221 | A * | 4/2020 | | G10L 15/26 |
| CN | 112699677 | A * | 4/2021 | | G06F 40/284 |
| CN | 111460132 | B * | 8/2021 | | G06N 3/045 |
| CN | 113449513 | A * | 9/2021 | | G06N 7/01 |
| CN | 114402384 | A * | 4/2022 | | G10L 15/22 |
| CN | 113051932 | B * | 11/2023 | | G06F 40/30 |
| CN | 117015780 | A * | 11/2023 | | G06F 40/30 |
| CN | 117195887 | A * | 12/2023 | | |
| CN | 117236324 | A * | 12/2023 | | |
| CN | 119415400 | A * | 2/2025 | | G06F 16/3341 |
| JP | 3597697 | B2 * | 12/2004 | | G06F 16/345 |
| JP | 4345321 | B2 * | 10/2009 | | G06F 16/40 |
| KR | 20250017170 | A * | 2/2025 | | G06N 3/09 |
| WO | WO-2020214316 | A1 * | 10/2020 | | G06V 40/23 |
| WO | WO-2023063172 | A1 * | 4/2023 | | G06Q 10/06393 |

* cited by examiner

300

S302

Detecting a triggering event to initiate the linking function

S304

Importing, by the linking function, defect records and work information such as work instructions

S306

Inferring and generating, by the linking function, one or more relationships between the defect records and the work information, and storing the generated inference results

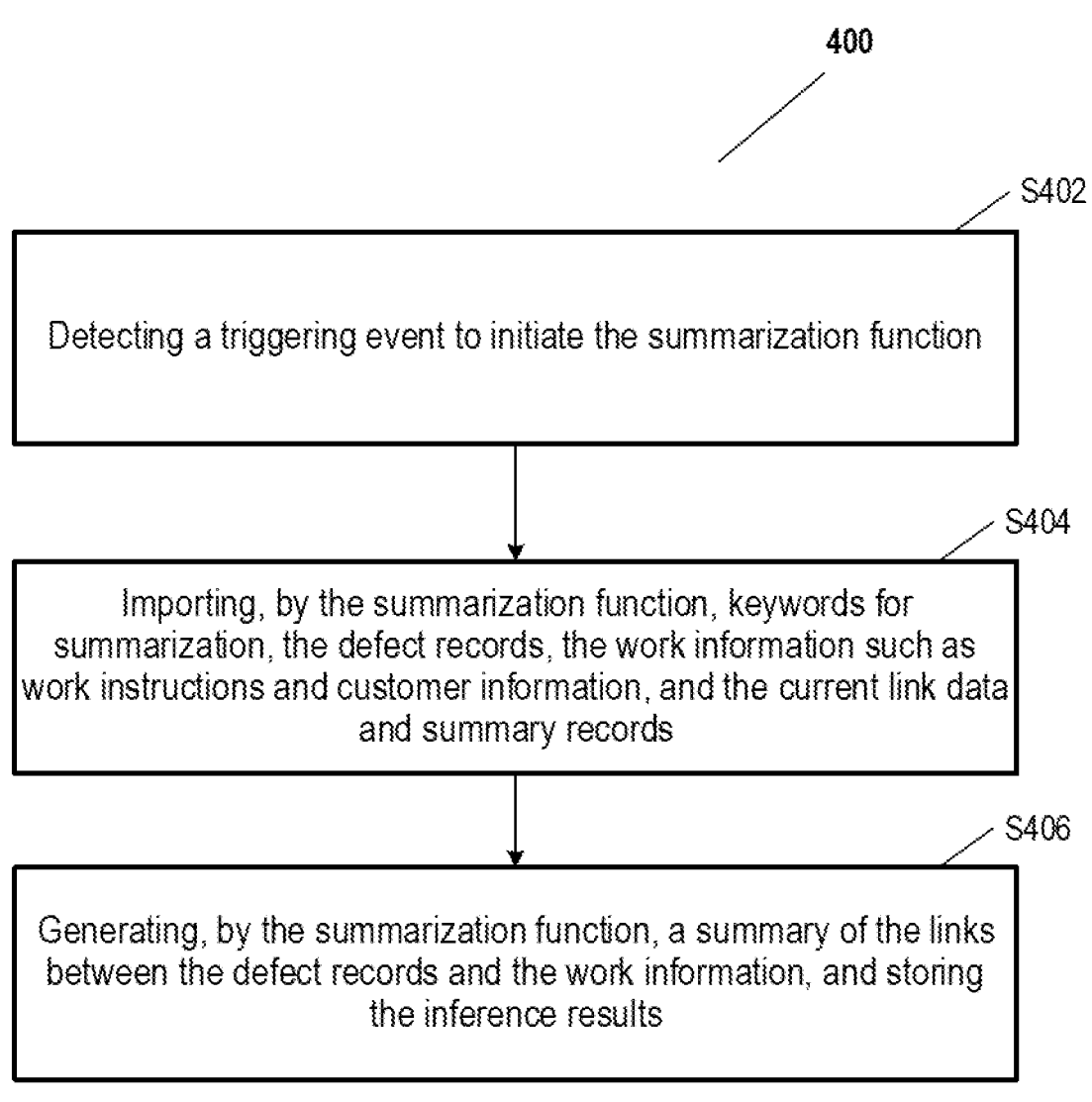

400

S402

Detecting a triggering event to initiate the summarization function

S404

Importing, by the summarization function, keywords for summarization, the defect records, the work information such as work instructions and customer information, and the current link data and summary records

S406

Generating, by the summarization function, a summary of the links between the defect records and the work information, and storing the inference results

FIG. 4

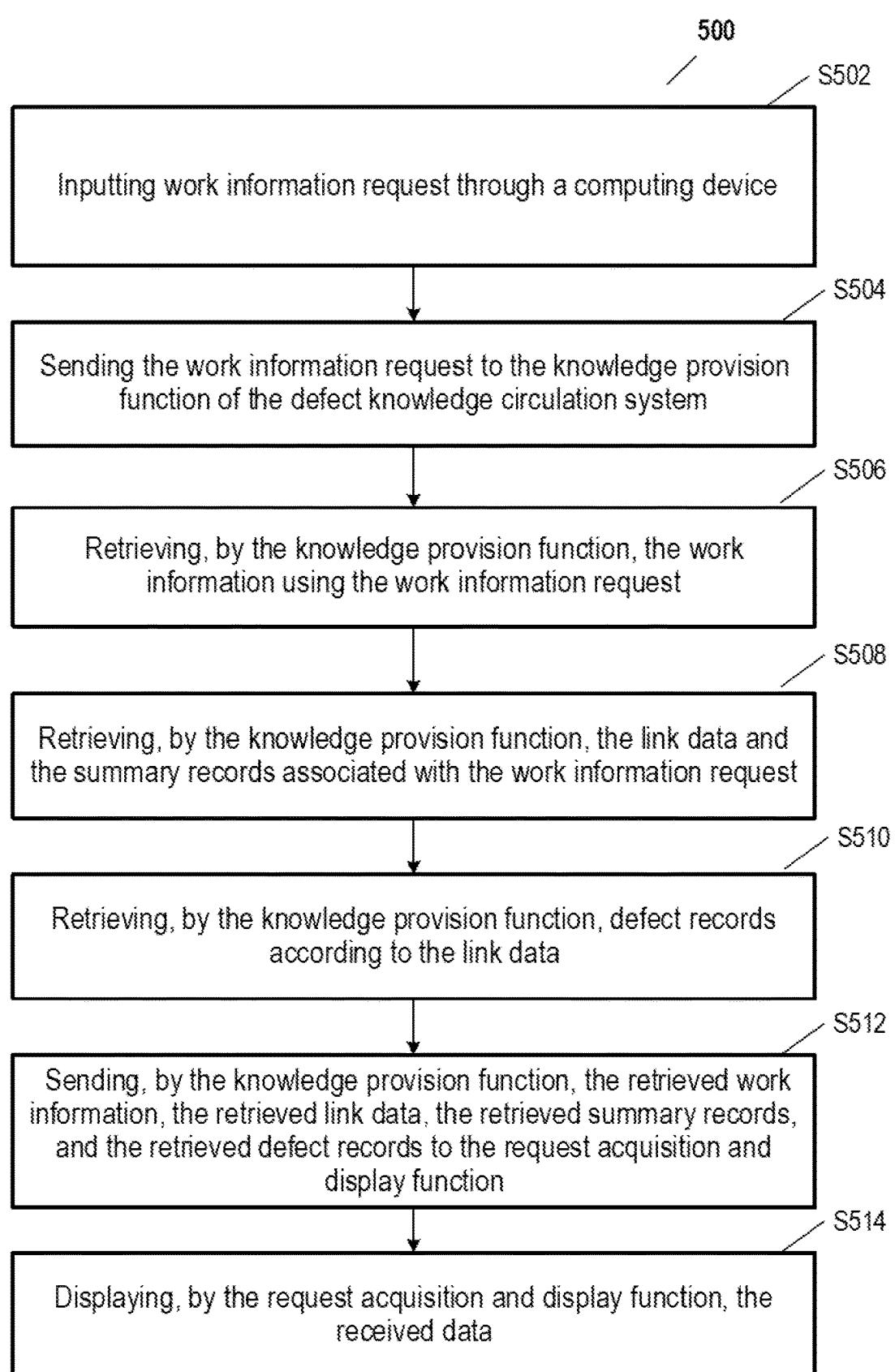

500

S502

Inputting work information request through a computing device

S504

Sending the work information request to the knowledge provision function of the defect knowledge circulation system

S506

Retrieving, by the knowledge provision function, the work information using the work information request

S508

Retrieving, by the knowledge provision function, the link data and the summary records associated with the work information request

S510

Retrieving, by the knowledge provision function, defect records according to the link data

S512

Sending, by the knowledge provision function, the retrieved work information, the retrieved link data, the retrieved summary records, and the retrieved defect records to the request acquisition and display function

S514

Displaying, by the request acquisition and display function, the received data

```
------ INSTRUCTION BEGIN ------                          802
InstructionID: I1
Product: TrainA and TrainB
Customer: CompanyA
Instruction:
        1. Attach a part A for the slider of TrainA
        2. Wire power cable for the part A
------ INSTRUCTION END ------
```

```
------ INSTRUCTION BEGIN ------                          804
InstructionID: I2
Product: TrainA
Customer: CompanyB
Instruction:
        1. Attach a part A for the slider of TrainA
        2. Wire power cable for the part A
------ INSTRUCTION END ------
```

```
------ DEFECT NOTE BEGIN ------
NoteID: N1
Notes from worker:
        There was a scratch on the door A
Meta-data:
        Date: 2023/11/8
        Station: Station 13
        Posted-by: "Kato"
        ProductID: "TrainAForCompanyA"
        ProductDescription: "A train car in the final inspection process, The type is TrainA, and it is for
        CompanyA"
------ DEFECT NOTE END ------
```

```
------- INSTRUCTION BEGIN -------
InstructionID: I1
Product: TrainA and TrainB
Customer: CompanyA
Instruction:
        1. Attach a part A for the slider of TrainA
        2. Wire power cable for the part A
------- INSTRUCTION END -------
------- INSTRUCTION BEGIN -------
InstructionID: I2
Product: TrainA
Customer: CompanyB
Instruction:
        1. Attach a part A for the slider of TrainA
        2. Wire power cable for the part A
------- INSTRUCTION END -------
------- DEFECT NOTE BEGIN -------
NoteID: N1
Notes from worker:
        There was a scratch on the door A
Meta-data:
        Date: 2023/11/8
        Station: Station 13
        Posted-by: "Kato"
        ProductID: "TrainAForCompanyA"
        ProductDescription: "A train car in the final inspection process, The
        type is TrainA, and it is for CompanyA"
------- DEFECT NOTE END -------
```

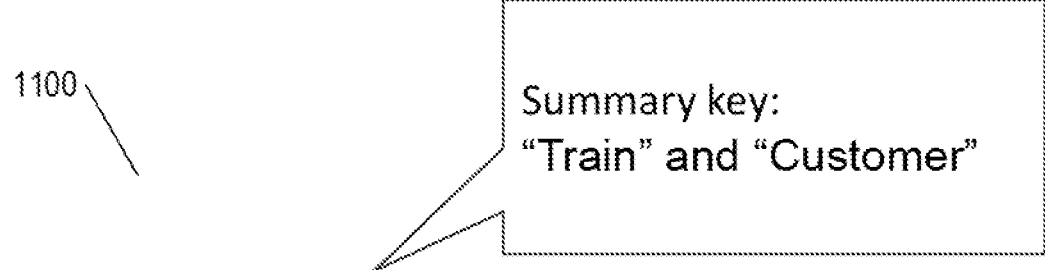

Summary key:
"Train" and "Customer"

TrainA for CompanyA:
- Defect Note N1 is associated with Instruction I1

TrainB for CompanyA:
- Defect Note N2 is associated with Instruction I1

TrainA for CompanyB:
- Defect Note N3 is associated with Instruction I2

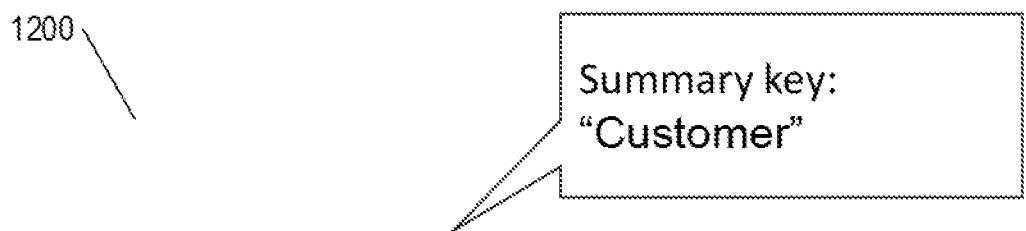

Summary key:
"Customer"

For CompanyA:
- TrainA has Defect Note N1 associated with Instruction I1
- TrainA has Defect Note N2 associated with Instruction I1
- The only Instruction associated with defects is I1
- Defect Notes N1 and N2 may be rooted in the same cause For CompanyB:
- TrainA has Defect Note N3 associated with Instruction I2

FIG. 12

DEFECT KNOWLEDGE CIRCULATION SYSTEM

BACKGROUND

Field

The present disclosure is generally directed to a method and a system for performing defect summarization.

Related Art

Factory workers regularly perform inspections during the manufacturing processes, including the assembly and the final inspection before shipping. During the inspections, they often discover defects that need to be fixed. It is important to find the defects at each manufacturing phase prior to shipping. It is also essential to avoid the same defects in future manufacturing processes.

It is essential to reflect the inspection results on future work instructions for manufacturing and inspection tasks. The inspection results usually include some notes describing the defects found. Although it is an essential source of knowledge to improve the processes to avoid future defects, the notes can be easily wasted since organizing notes and inspecting the results is a great burden on the workers. Existing systems, like MES (Manufacturing Execution System), can help workers automate and record the inspection results. However, they need more technologies to organize the notes and the knowledge that can be extracted from them.

In the related art, a method for performing defect detection through images is disclosed. Polygons are applied over the images for defect-pattern detection and collection. While defect detections help workers fix the defects, it does not help the workers understand which processes may have caused the defect.

There exists a need for a method and a system that is capable of intelligently circulating defect knowledge and performing defect summarization based on the circulated defect knowledge.

SUMMARY

Aspects of the present disclosure involve an innovative method for performing defect summarization. The method may include receiving, by a processor, defect records associated with an operation; receiving, by the processor, work information associated with the operation; linking, by the processor, the defect records and the work information using a first Artificial Intelligence (AI) model to generate linked information; and performing, by the processor, summary generation using a second AI model to generate work summary using summarization keywords, the defect records, and the work information, as input to the second AI model.

Aspects of the present disclosure involve an innovative non-transitory computer readable medium, storing instructions for performing defect summarization. The instructions may include receiving defect records associated with an operation; receiving work information associated with the operation; linking the defect records and the work information using a first AI model to generate linked information; and performing summary generation using a second AI model to generate work summary using summarization keywords, the defect records, and the work information, as input to the second AI model.

Aspects of the present disclosure involve an innovative server system for performing defect summarization. The system may include receiving, by a processor, defect records associated with an operation; receiving, by the processor, work information associated with the operation; linking, by the processor, the defect records and the work information using a first AI model to generate linked information; and performing, by the processor, summary generation using a second AI model to generate work summary using summarization keywords, the defect records, and the work information, as input to the second AI model.

Aspects of the present disclosure involve an innovative system for performing defect summarization. The system may include means for receiving defect records associated with an operation; means for receiving work information associated with the operation; means for linking the defect records and the work information using a first AI model to generate linked information; and means for performing summary generation using a second AI model to generate work summary using summarization keywords, the defect records, and the work information, as input to the second AI model.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 4 illustrates an example process flow 400 for performing the summarization function processing steps, in accordance with an example implementation FIG. 5 illustrates an example process flow 500 for performing the knowledge provision function processing steps, in accordance with an example implementation.

FIG. 8 illustrates example work instructions 800, in accordance with an example implementation.

FIG. 9 illustrates an example defect record 900, in accordance with an example implementation.

FIG. 10 illustrates an example text file 1000 aggregated by the data aggregator 140a-1, in accordance with an example implementation.

FIG. 11 illustrates an example output 1100 of the linking function 140a, in accordance with an example implementation.

FIG. 12 illustrates an example output 1200 of the summarization function 140b using "customer" as summary keyword, in accordance with an example implementation.

DETAILED DESCRIPTION

Figure 1:
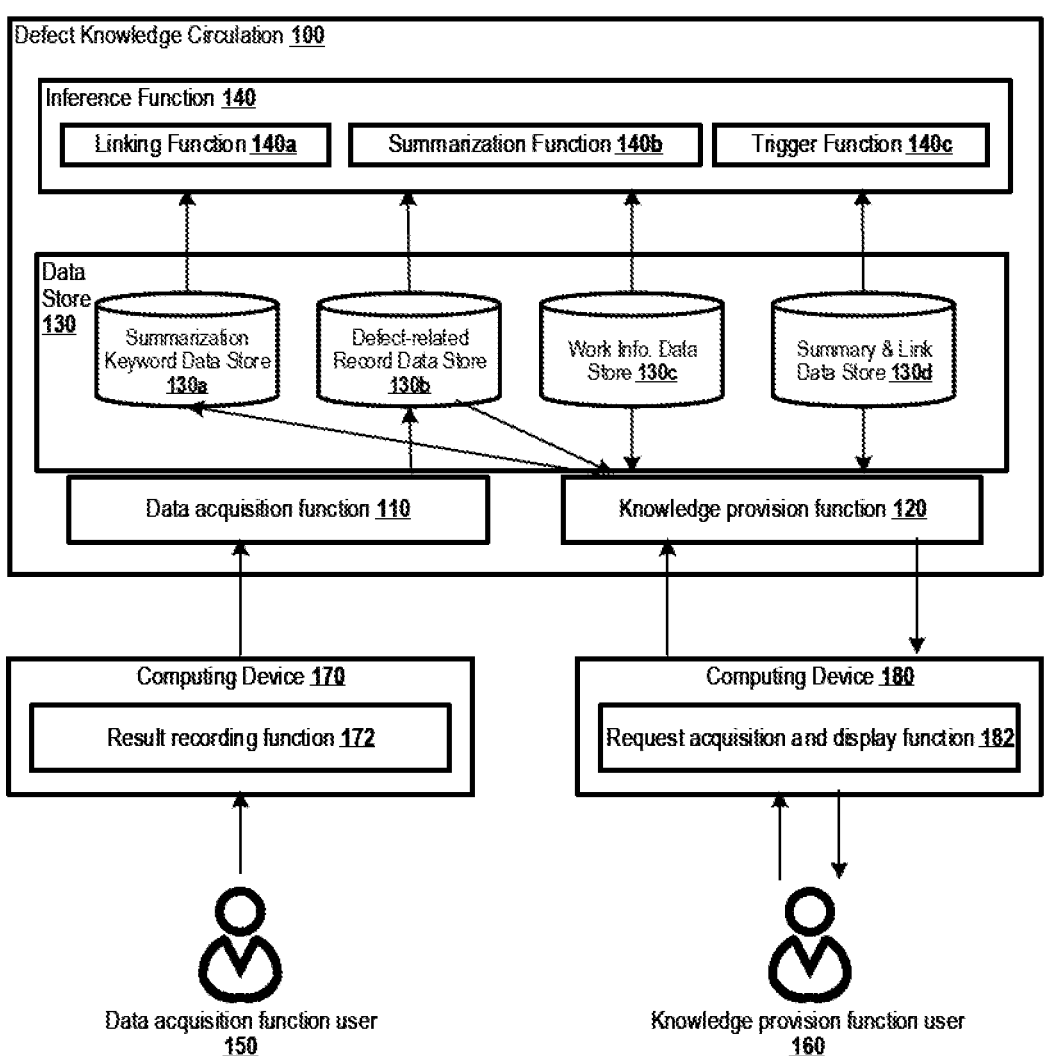
FIG. 1 illustrates an example defect knowledge circulation system 100, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Present example implementations relate to methods and systems for effectively associating/linking inspection results, especially the defect records, with work instructions and other work-related information. Example implementations summarize the defect records for ease of review, and provide associated information and summarized defect records for work information requested by a user. In some example implementations, work information is information related to industrial systems and associated operations. The information format includes, but not limited to, document files, images, videos, Hypertext Markup Language (HTML) files, Uniform Resource Locators (URLs) indicating the location of the data, etc. Target users are the workers in industrial facilities/systems, such as factories, distribution centers, etc. The workers may include, but not limited to, shop floor operators/workers, operation managers, etc.

FIG. 1 illustrates an example defect knowledge circulation system 100, in accordance with an example implementation. The defect knowledge circulation system 100 may include components such as, but not limited to, a data acquisition function 110, a knowledge provision function 120, a data store 130, an inference function 140, etc.

Two types of users exist for the defect knowledge circulation system 100: a data acquisition function user 150 and a knowledge provision function user 160. The data acquisition function user 150 and the knowledge provision function user 160 can be the same person/worker, as the titles represent roles only. The data acquisition function user 150 operates from a computing device 170, and the knowledge provision function user 160 operates from a computing device 180. The computing device 170 has a result recording function 172 for recording and transmitting defect-related record data to the defect knowledge circulation system 100. The computing device 170 can be any computing device such as, but not limited to a mobile phone, a smart device, a tablet computer, a desktop computer, a laptop computer, a virtual/augmented reality device, internet of things (IoT) device, etc.

The computing device 180 has a request acquisition and display function 182 for receiving work information retrieval request from the knowledge provision function user 160. In response to receiving the work information retrieval request, the request acquisition and display function 182 retrieves the defect-related data for the knowledge provision function user 160 to review. The computing device 180 can be any computing device such as, but not limited to a mobile phone, a smart device, a tablet computer, a desktop computer, a laptop computer, a virtual/augmented reality device, internet of things (IoT) device, etc.

The data store 130 may include components such as, but not limited to, a summarization keyword data store 130a, a defect-related record data store 130b, a work information data store 130c, and a summary and link data store 130d. The data store 130 may be one or more storage media such as, but not limited to, a non-volatile memory device, volatile memory device, removable disk, hard disk drive, optical disk, etc. In some example implementations, the data store 130 is external to the defect knowledge circulation system 100.

The inference function 140 may include components such as, but not limited to, a linking function 140a, a summarization function 140b, and a trigger function 140c. The inference function 140 associates the reported defect-related records and the work information (e.g., work instructions, etc.), to help users/workers discover the potential cause of the defects. The linking function 140a imports data from the data store 130 to infer linkage between the data in the defect-related record data store 130b and the work information data store 130c, and stores the inference results in the summary and link data store 130d. The inference function 140 also has a summarization function 140b that summarizes the defect-related records according to the inferred links between the defect-related record data store 130b and the work information data store 130c, and stores the summarization result in the summary and link data store 130d. The summarization keyword data store 130a stores summarization key words that are used by the summarization function 140b in generating summaries, which will be described in more detail below.

The data acquisition function 110 receives defect-related records from the computing device 170 and stores the data in the defect-related record data store 130b. The knowledge provision function 120 retrieves work information based on a work information request input by the knowledge provision function user 160. The knowledge provision function 120 then retrieves the associated defect-related records and summary, and provides/transmits them to the computing device 180 for the knowledge provision function user 160 to review.

Figure 2:
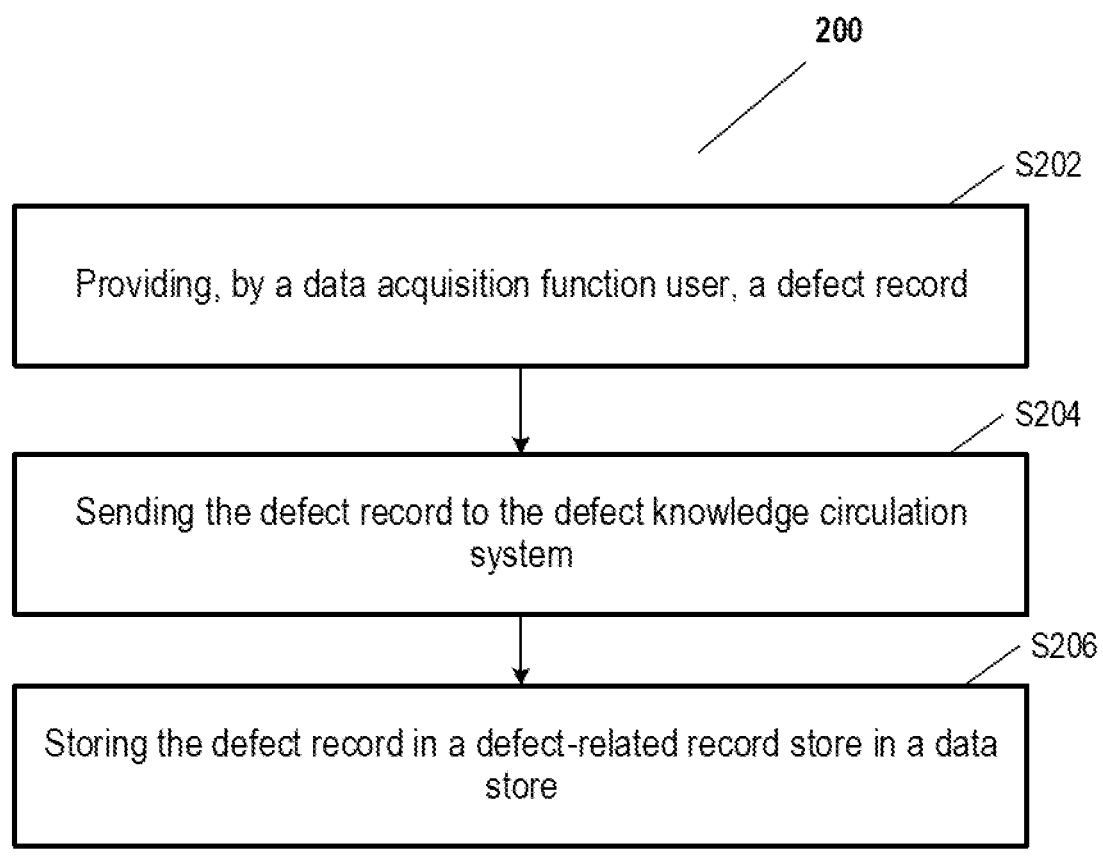
FIG. 2 illustrates an example process flow 200 for performing the data acquisition steps, in accordance with an example implementation.

FIG. 2 illustrates an example process flow 200 for performing the data acquisition steps, in accordance with an example implementation. The process flow 200 begins at step S202 where a defect record is provided/entered by a data acquisition function user 150. The defect record is provided as an inspection result using the result recording function 172 of the computing device 170. Defect records may include text notes for the defect, photos/videos, metadata such as the reporter, reporting time, and process ID of the inspection tasks, etc. The data acquisition function user 150 may be a worker on a shop floor where inspection was performed. Defect record input may occur in every inspection task throughout the various processes in the factory.

At step S204, the defect record from is sent to the defect knowledge circulation system 100. The defect record is sent/transmitted by the computing device 170 to the data acquisition function 110 of the defect knowledge circulation system 100. At step S206, the data acquisition function 110 stores the defect record in the defect-related record data store 130b in the data store 130.

Figure 3:
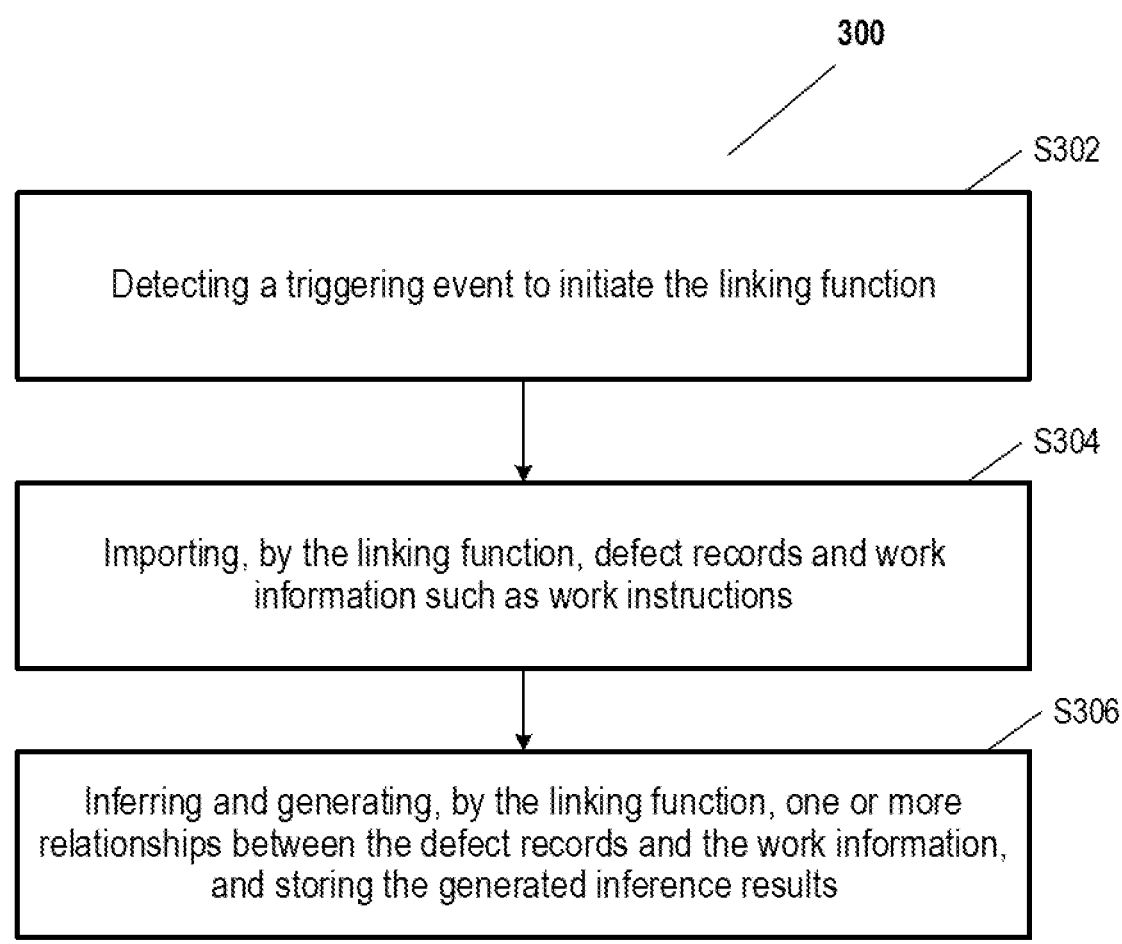
FIG. 3 illustrates an example process flow 300 for performing the linking function processing steps, in accordance with an example implementation.

FIG. 3 illustrates an example process flow 300 for performing the linking function processing steps, in accordance with an example implementation. At step S302, the trigger function 140*c* detects a triggering event (e.g., the addition of defect record in the defect-related record data store 130*b*, etc.) to initiate the linking function 140*a*. A triggering event may include, but not limited to, the addition of defect record in the defect-related record data store 130*b*, a user request for initiating the linking function 140*a*, the number of last added defect records since last execution of the linking function 140*a*, a time threshold since last execution of the linking function 140*a*, etc.

The process then continues to step S304 where the linking function 140*a* imports defect records from the defect-related record data store 130*b* and work information, such as work instructions, from the work information data store 130*c*. At step S306, the linking function 140*a* infers and generates a relationship between the defect records and the work information, and stores the inference results in the summary and link data store 130*d*. The linking function 140*a* is described in more detail below.

FIG. 4 illustrates an example process flow 400 for performing the summarization function processing steps, in accordance with an example implementation. The process flow 400 begins at step S402 where the trigger function 140*c* detects a triggering event to initiate the summarization function 140*b*. A triggering event may include, but not limited to, the addition of defect record in the defect-related record data store 130*b*, a user request for initiating the summarization function 140*b*, the number of last added defect records since last execution of the summarization function 140*b*, a time threshold since last execution of the summarization function 140*b*, etc.

The process then continues to step S404 where the summarization function 140*b* imports keywords for summarization from the summarization keyword data store 130*a*, defect records from the defect-related record data store 130*b*, work information such as work instructions and customer information from work information data store 130*c*, and current link data and summary records from the summary and link data store 130*d*. At step S406, the summarization function 140*b* generates a summary of the links between the retrieved defect records and the work information using the imported keywords, and stores the inference results in the summary and link data store 130*d*. The summarization function 140*b* is described in more detail below. The output of the summarization function 140*b* may be based on one or more imported keywords/categories. For example, if the keyword is:

"Process": a summary of the defects is generated for each process.

"Role of workers": a summary of the defects is generated for each role of the workers.

"Machine": a summary of the defects is generated for each machine in the factory.

"Customer": a summary of the defects is generated for each customer of the factory.

"Product": a summary of the defects is generated for each type of the product.

FIG. 5 illustrates an example process flow 500 for performing the knowledge provision function processing steps, in accordance with an example implementation. At step S502, the knowledge provision function user 160 inputs work information request through the request acquisition and display function 182 of the computing device 180. In some example implementations, the work information request may be, but not limited to, an identification number/identifier associated with the work information.

At step S504, the request acquisition and display function 182 of the computing device 180 transmits/sends the work information request to the knowledge provision function 120 of the defect knowledge circulation system 100. At step S506, the knowledge provision function 120 retrieves the work information using the work information request.

The process then proceeds to step S508 where the knowledge provision function 120 retrieves the link data and the summary records associated with the work information request. At step S510, the knowledge provision function 120 retrieves the defect records from the defect-related record data store 130*b* according to the retrieved link data.

At step S512, the knowledge provision function 120 sends the retrieved work information, the retrieved link data, the retrieved summary records, and the retrieved defect records to the request acquisition and display function 182. The request acquisition and display function 182 then displays the received data at step S514

Figure 6:
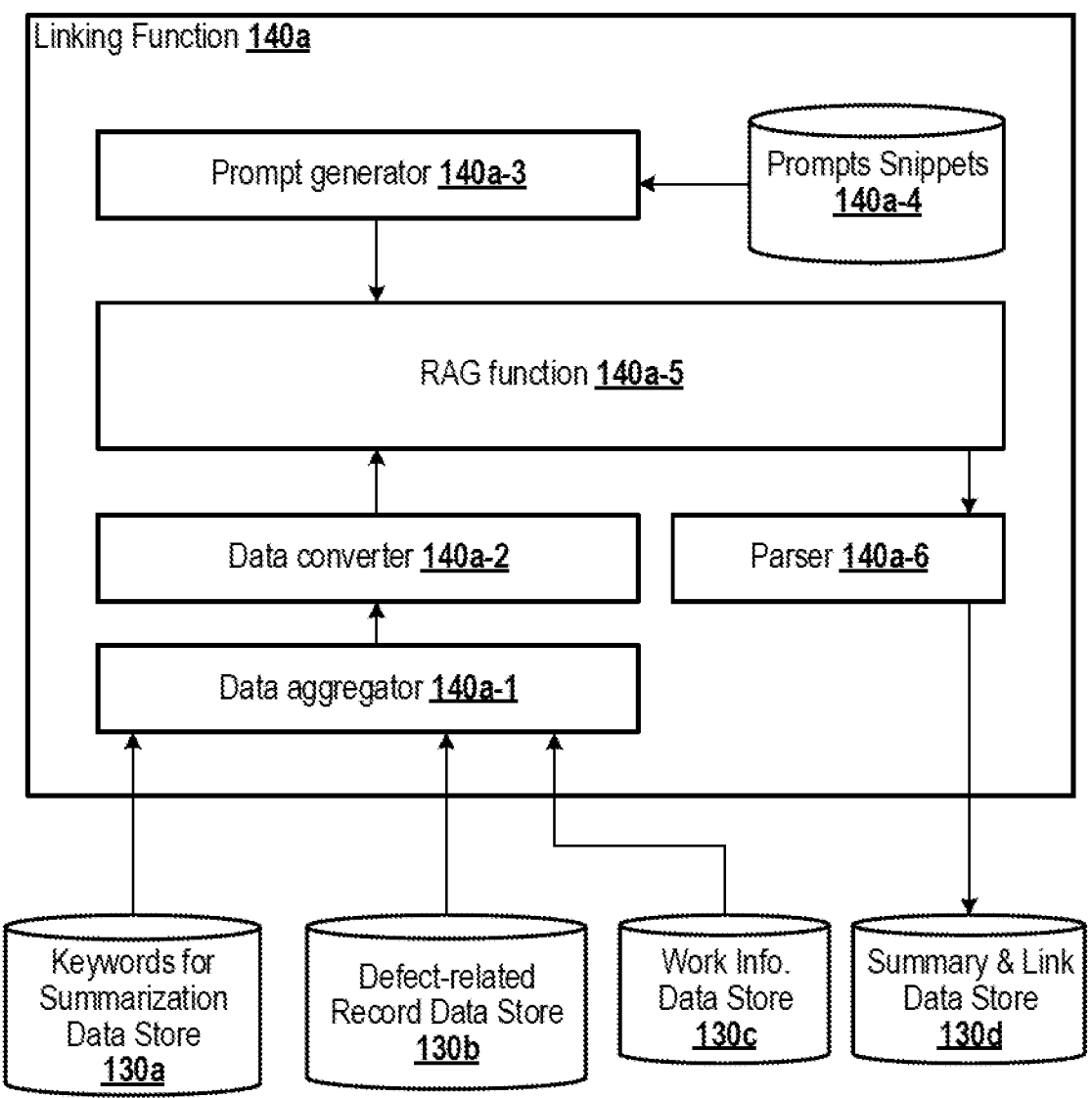
FIG. 6 illustrates an example architecture of the linking function 140a, in accordance with an example implementation.

FIG. 6 illustrates an example architecture of the linking function 140*a*, in accordance with an example implementation. As illustrated in FIG. 6, the linking function 140*a* may include components such as, but not limited to, a data aggregator 140*a*-1, a data converter 140*a*-2, a prompt generator 140*a*-3, prompt snippets 140*a*-4, a RAG (Retrieval Augmented Generation) function 140*a*-5, a parser 140*a*-6, etc.

The data aggregator 140*a*-1 aggregates the imported information into a single text file, which is then converted into chunks for embedding by the data converter 140*a*-2 when the file size exceeds a predetermined size (e.g., the file size exceeds the context window size of the RAG function 140*a*-5). The prompt snippets 104*a*-4 are defined text blocks or codes that may be utilized by the prompt generator 140*a*-3 in prompt generation.

The RAG function 140*a*-5 generates a response using the prompt derived from the prompt generator 140*a*-3 and the converted chunks derived from the data converter 140*a*-2. The RAG function 140*a*-5 may utilize a Machine Learning (ML)/Artificial Intelligence (AI) model, an ontology-based reasoning function, or any other formal reasoning techniques. The Machine Learning (ML)/Artificial Intelligence (AI) model may be a deep learning model such as a Large Language Model (LLM). The response generated by the RAG function 140*a*-5 is then parsed and stored by the parser 140*a*-6.

Figure 7:
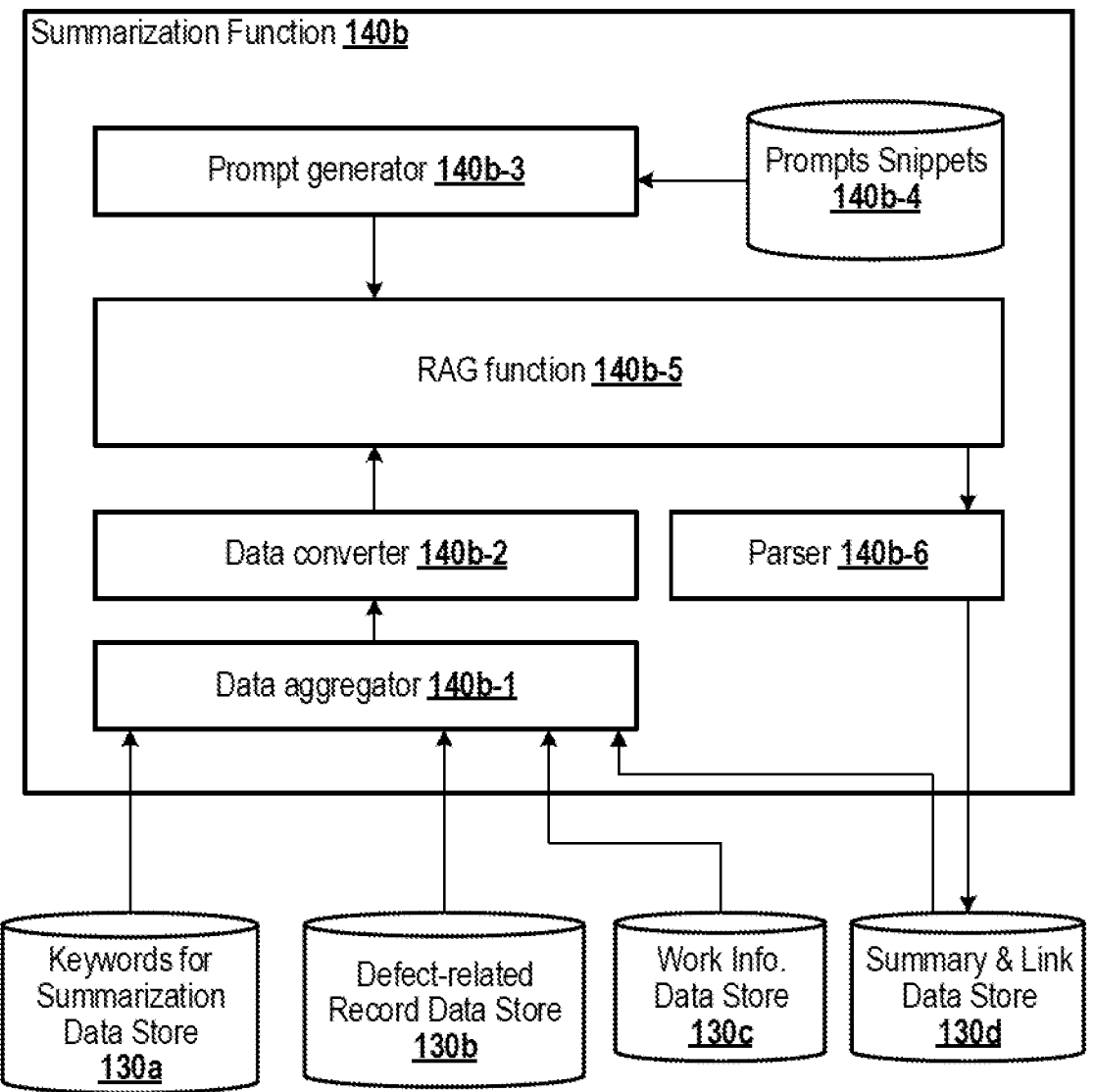
FIG. 7 illustrates an example architecture of the summarization function 140b, in accordance with an example implementation.

FIG. 7 illustrates an example architecture of the summarization function 140*b*, in accordance with an example implementation. As illustrated in FIG. 7, the summarization function 140*b* may include components similar to those of FIG. 6, such as, but not limited to, a data aggregator 140*b*-1, a data converter 140*b*-2, a prompt generator 140*b*-3, prompt snippets 140*b*-4, a RAG (Retrieval Augmented Generation) function 140*b*-5, a parser 140*b*-6, etc.

The data aggregator 140*b*-1 aggregates the imported information into a single text file, which is then converted into chunks for embedding by the data converter 140*b*-2 when the file size exceeds a predetermined size (e.g., the file size exceeds the context window size of the RAG function 140*b*-5). The prompt snippets 104*b*-4 are defined text blocks or codes that may be utilized by the prompt generator 140*b*-3 in prompt generation.

The RAG function 140*b*-5 generates a response using the prompt derived from the prompt generator 140*b*-3 and the converted chunks derived from the data converter 140*b*-2. The RAG function 140*b*-5 may utilize a Machine Learning (ML)/Artificial Intelligence (AI) model, an ontology-based reasoning function, or any other formal reasoning techniques. The Machine Learning (ML)/Artificial Intelligence (AI) model may be a deep learning model such as a Large Language Model (LLM). In some example implementations, the input and output of the LLM may comprise a sequence of words (e.g., using the prompt provided as input, etc.). The LLM may include a module that takes the prompt as an input, generates a single token (e.g., a word, space, etc.) as a part of the output, and repeats the token generation process until the end of the sequence is reached. The LLM may be trained using different types of data dependent on the model architecture (e.g., a large training set of text data, etc.). The set of text data may be tokenized to train the LLM to predict the next word in a sequence of text with any of unsupervised, semi-supervised, supervised, or reinforcement learning method. The response generated by the RAG function 140*b*-5 is then parsed and stored by the parser 140*b*-6.

FIG. 8 illustrates example work instructions 800, in accordance with an example implementation. As illustrated in FIG. 8, work instructions 800 may include a first work instruction 802 for TrainA and TrainB, and a second work instruction 804 for TrainA. The first work instruction is associated with the customer CompanyA, whereas the second work instruction is associated with the customer CompanyB. For case of parsing, each instruction has beginning and ending tags like "INSTRUCTION BEGIN" and "INSTRUCTION END."

FIG. 9 illustrates an example defect record 900, in accordance with an example implementation. Defect record 900 is the defect record of TrainA associated with CompanyA. As shown in FIG. 9, the defect record 900 provides information on noted defect and metadata associated with the defect (e.g., reporting date, location of occurrence, product ID, reporting worker, product description, etc.). For ease of parsing, each defect record has beginning and ending tags like "DEFECT NOTE BEGIN" and "DEFECT NOTE END."

FIG. 10 illustrates an example text file 1000 aggregated by the data aggregator 140*a*-1, in accordance with an example implementation. The work instructions 800 and the defect record 900 are aggregated to form a single text file for chunking by the data converter 140*a*-2 and subsequently for processing by the RAG function 140*a*-5.

FIG. 11 illustrates an example output 1100 of the linking function 140*a*, in accordance with an example implementation. The linking function 140*a* infers the links between the work information and defect records, and groups the inferred links by the summary keywords (e.g., "Train" and "Customer"). In some example implementations, additional defect records may be derived using components such as RAG functions 140*a*-5 and 140*b*-5 and used for further processing. FIG. 12 illustrates an example output 1200 of the summarization function 140*b* using "customer" as summary keyword, in accordance with an example implementation.

The foregoing example implementation may have various benefits and advantages, such as reducing the burden of organizing defect knowledge and improving the quality and efficiency of factory operations. By intelligently linking the defect records and work instructions, the system provides users with unique operational insights that can be used in performing production or system optimizations.

Figure 13:
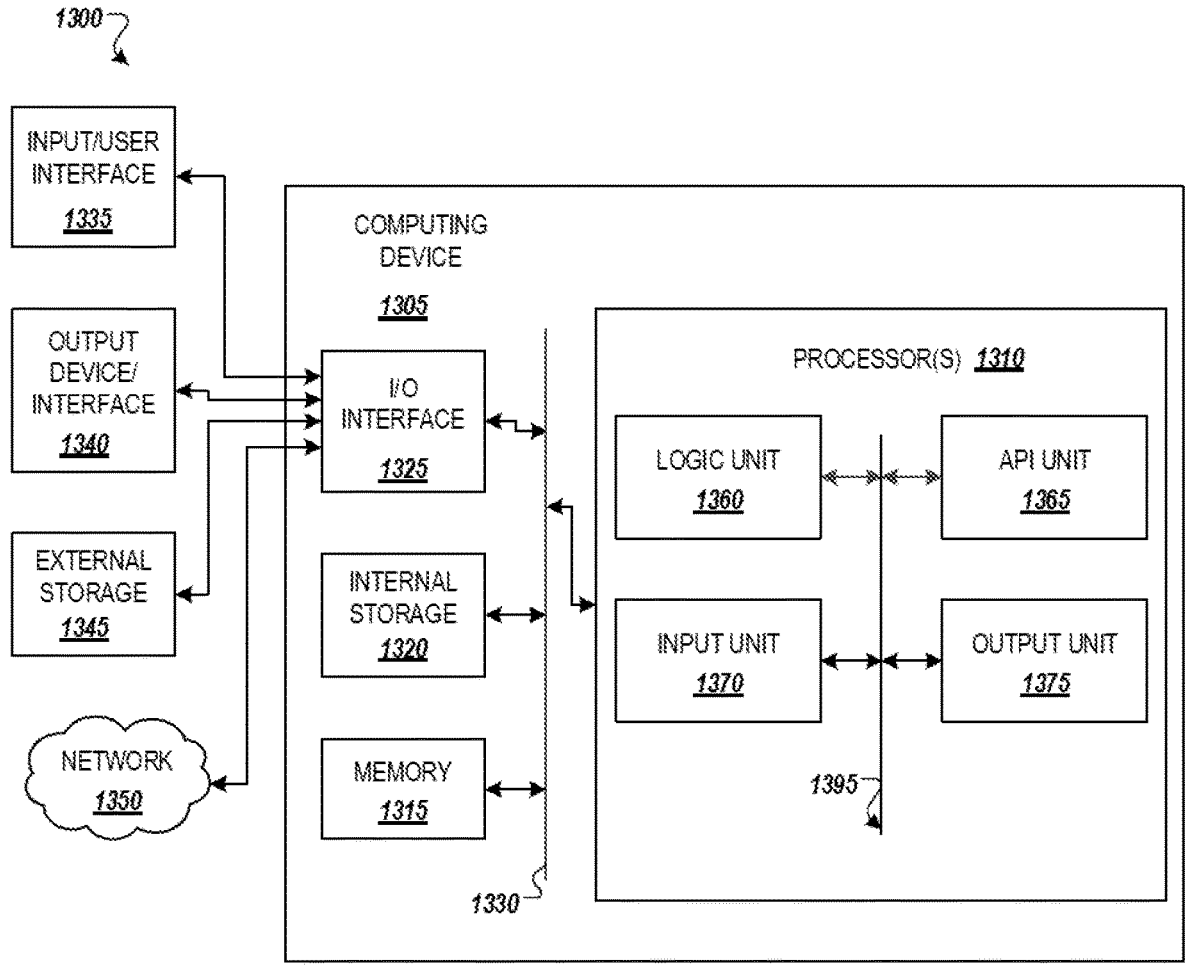
FIG. 13 illustrates an example computing environment with an example computer device suitable for use in some example implementations.

FIG. 13 illustrates an example computing environment with an example computer device suitable for use in some example implementations. Computer device 1305 in computing environment 1300 can include one or more processing units, cores, or processors 1310, memory 1315 (e.g., RAM, ROM, and/or the like), internal storage 1320 (e.g., magnetic, optical, solid-state storage, and/or organic), and/or IO interface 1325, any of which can be coupled on a communication mechanism or bus 1330 for communicating information or embedded in the computer device 1305. IO interface 1325 is also configured to receive images from cameras or provide images to projectors or displays, depending on the desired implementation.

Computer device 1305 can be communicatively coupled to input/user interface 1335 and output device/interface 1340. Either one or both of the input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via IO interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

IO interface 1325 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, the input unit 1370, the output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide an output based on the calculations described in example implementations.

Processor(s) 1310 can be configured to receive defect records associated with an operation; receive work information associated with the operation; link the defect records and the work information using a first Artificial Intelligence (AI) model to generate linked information; and perform summary generation using a second AI model to generate work summary using summarization keywords, the defect records, and the work information, as input to the second AI model as shown in FIGS. 1-5. The processor(s) 1310 may also be configured to receive a work information retrieval request from a user for retrieving the work information from a database; and retrieve and display using the linked information to retrieve the defect records, the work information, and the work summary to the user as shown in FIGS. 1 and 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for performing defect summarization, the method comprising:

receiving, by the processor, a work information retrieval request from a user device, the work information retrieval request associated with an identifier from a database of a defect knowledge circulation system;

retrieving, by the processor executing a knowledge provisioning function of the defect knowledge circulation system configured to intake the work information retrieval request as input, work information, link data, a summary record, and defect records associated with the work information, wherein the defect records are generated and stored based on an inspection result of the work information, wherein the link data is generated and stored based on inferring a relationship between the defect records and the work information and grouping the inferred link by summary keywords;

and performing, by the processor, summary generation using a trained machine learning model to generate and store a work summary, the trained machine learning model configured to generate the work summary by using the generated and stored link data and by training the trained machine learning model with applying the summary keywords, the generated and stored defect records, and the work information.

2. The method of claim 1, wherein the knowledge provisioning function and the trained machine learning model are large language models (LLM).

3. The method of claim 1, further comprising:

retrieving and displaying, by the processor, using the generated and stored link data to retrieve the defect records, the work information, and the work summary to the user device.

4. The method of claim 1, wherein the link data is generated by the knowledge provisioning function in response to receipt of the defect records.

5. The method of claim 1, wherein the work summary comprises one or more of a process defect summary, a role defect summary, a machine defect summary, a customer defect summary, or a product defect summary.

6. The method of claim 1, wherein the work information comprises work instructions and process information.

7. A system for performing defect summarization, the system comprising: a data storage; and a processor in communication with the data storage, wherein the processor is configured to:

receiving, by the processor, a work information retrieval request from a user device, the work information retrieval request associated with an identifier from a database of a defect knowledge circulation system;

retrieving, by the processor executing a knowledge provisioning function of the defect knowledge circulation system configured to intake the work information retrieval request as input, work information, link data, a summary record, and defect records associated with the work information, wherein the defect records are generated and stored based on an inspection result of the work information, wherein the link data is generated and stored based on inferring a relationship between the defect records and the work information and grouping the inferred link by summary keywords; and performing, by the processor, summary generation using a trained machine learning model to generate and store a work summary, the trained machine learning model configured to generate the work summary by using the generated and stored link data and by training the trained machine learning model with applying the summary keywords, the generated and stored defect records, and the work information.

8. The system of claim 7, wherein the knowledge provisioning function and the trained machine learning model are large language models (LLM).

9. The system of claim 7, wherein the processor is further configured to: retrieving and displaying, by the processor, using the generated and stored link data to retrieve the defect records, the work information, and the work summary to the user device.

10. The system of claim 7, wherein the link data is generated by the knowledge provisioning function in response to receipt of the defect records.

11. The system of claim 7, wherein the work summary comprises one or more of a process defect summary, a role defect summary, a machine defect summary, a customer defect summary, or a product defect summary.

12. The system of claim 7, wherein the work information comprises work instructions and process information.

* * * * *